United States Patent
Leibmann et al.

(10) Patent No.: US 11,310,059 B2
(45) Date of Patent: Apr. 19, 2022

(54) EPHEMERAL CRYPTOGRAPHY KEYS FOR AUTHENTICATING COMPUTING SERVICES

(71) Applicant: Microsoft Technology Licensing, LLC, Redmond, WA (US)

(72) Inventors: Matthias Adam Leibmann, Redmond, WA (US); Victor Boctor, Bellevue, WA (US); Grigory V. Kaplin, Redmond, WA (US); Liang Zou, Suzhou (CN); Paranthaman Saravanan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 16/890,654

(22) Filed: Jun. 2, 2020

(65) Prior Publication Data
US 2021/0377044 A1    Dec. 2, 2021

(51) Int. Cl.
*H04L 9/32* (2006.01)
*H04L 9/08* (2006.01)

(52) U.S. Cl.
CPC .......... *H04L 9/3247* (2013.01); *H04L 9/0891* (2013.01); *H04L 2209/24* (2013.01)

(58) Field of Classification Search
CPC . H04L 9/3247; H04L 9/0891; H04L 2209/24; H04L 9/0894; H04L 9/3213; H04L 63/06; H04W 12/04
See application file for complete search history.

(56) References Cited

U.S. PATENT DOCUMENTS

| 7,707,420 B1 | 4/2010 | Little |
| 8,341,718 B2 | 12/2012 | Chow et al. |

(Continued)

FOREIGN PATENT DOCUMENTS

| EP | 2442253 A1 | 4/2012 | |
| WO | 2019028698 A1 | 2/2019 | |
| WO | WO 2019/179608 A1 * | 9/2019 | ............ H04W 12/06 |

OTHER PUBLICATIONS

"International Search Report and Written Opinion Issued in PCT Application No. PCT/US21/023552", dated Jun. 10, 2021, 12 Pages.

(Continued)

*Primary Examiner* — Christopher A Revak
(74) *Attorney, Agent, or Firm* — Liang IP, PLLC

(57) ABSTRACT

Techniques of data authentication in a distributed computing system are disclosed herein. One example technique includes receiving a request for performing an operation along with a data package that includes a security token, a first digital signature of the security token generated using an ephemeral private key, and an ephemeral public key with a second digital signature generated using a master private key stored at a secure location. The example technique can also include initially validating the second digital signature using a public key corresponding to the master private key, and upon validating the second digital signature, validating the first digital signature of the security token using the ephemeral public key included in the data package. Upon validating that the first digital signature of the security token, the request can be authenticated, and the requested operation can be performed.

20 Claims, 10 Drawing Sheets

(56) References Cited

U.S. PATENT DOCUMENTS

| | | | |
|---|---|---|---|
| 8,997,198 B1* | 3/2015 | Kelley | G06F 21/335 726/10 |
| 9,118,467 B2 | 8/2015 | Maletsky et al. | |
| 10,277,406 B1 | 4/2019 | Veladanda et al. | |
| 10,686,779 B2* | 6/2020 | Glozman | H04L 9/3215 |
| 2016/0065370 A1 | 3/2016 | Le saint et al. | |
| 2017/0034168 A1* | 2/2017 | Wilson | H04L 63/0823 |
| 2018/0211035 A1 | 7/2018 | Costa | |
| 2019/0356482 A1* | 11/2019 | Nix | H04L 9/14 |
| 2020/0059360 A1 | 2/2020 | Martynov et al. | |
| 2020/0076791 A1* | 3/2020 | Kishimoto | H04L 9/0825 |
| 2021/0075587 A1* | 3/2021 | Alwen | H04L 9/0891 |
| 2021/0209220 A1* | 7/2021 | Laing | G06F 21/44 |
| 2021/0288808 A1* | 9/2021 | Bahety | H04L 9/3247 |

OTHER PUBLICATIONS

Claeys, et al., "Securing Complex IoT Platforms with Token Based Access Control and Authenticated Key Establishment", In Proceedings of the International Workshop on Secure Internet of Things, Sep. 15, 2017, 9 Pages.

"PKI Secrets Engine", Retrieved from: https://web.archive.org/web/20200209224524/https:/www.vaultproject.io/docs/secrets/pki/, Feb. 9, 2020, 20 Pages.

"Secure Token Service", Retrieved from: https://patterns.arcitura.com/cloud-computing patterns/mechanisms/secure_token_service, Retrieved Date: Apr. 27, 2020, 3 Pages.

"Security Token Service STS", Retrieved from: https://docs.vmware.com/en/VMware-vSphere/6.5/com.vmware.psc.doc/GUID-18482A49-F9F8-4755-9113-3ADBAFE74EA3.html, Retrieved Date: Apr. 27, 2020, 2 Pages.

Casey, et al., "Service-to-Service Authentication to Azure Key Vault using .NET", Retrieved from: https://docs.microsoft.com/en-us/azure/key-vault/general/service-to-service-authentication, Aug. 28, 2019, 7 Pages.

Michael, et al., "Key Management Strategies for Safeguards Authentication and Encryption", In Proceedings of IAEA Symposium on International Safeguards, Sep. 1, 2019, 2 pages.

Murphy, Alan, "Using the NGINX Plus Key-Value Store to Secure Ephemeral SSL Keys from HashiCorp Vault TagsHashiCorp, SSL/TLS, security, securing SSL keys", Retrieved from: https://www.nginx.com/blog/nginx-plus-key-value-store-to-secure-ephemeral-ssl-keys-from-hashicorp-vault/, Apr. 24, 2014, 15 Pages.

Sabath, Mariusz, "Protecting Data using Secret Management with Trusted Service Identity", Retrieved from: https://developer.ibm.com/articles/protecting-data-using-secret-management-trusted-service-identity/, Apr. 23, 2020, 10 pages.

* cited by examiner

EPHEMERAL CRYPTOGRAPHY KEYS FOR AUTHENTICATING COMPUTING SERVICES

BACKGROUND

Remote or cloud computing systems typically utilize large numbers of remote servers housed in datacenters to provide compute, storage, network, and other computing services. The remote servers can be interconnected by computer networks to form one or more computing clusters. Each remote server in the computing clusters can host one or more virtual machines (VMs), containers, virtual switches, load balancers, and other types of virtualized components for resource sharing. During operation, the virtual machines or containers can facilitate execution of user applications to provide corresponding computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain computing facilities, remote servers can provide computing services to multiple subscribers or tenants via virtualization of compute, storage, network, or other suitable types of physical resources. For example, a server can execute suitable instructions on an operating system to provide a hypervisor for managing multiple virtual machines hosted at the server. The server can also provide a container manager for managing multiple containers on the server. Each virtual machine or container can execute suitable applications to provide computing services to users of tenants. As such, multiple tenants can share physical resources as computing services at the servers. On the other hand, a single tenant can also consume physical resources from multiple servers, storage devices, or other suitable components of the computing facilities as a single computing service.

In certain computing facilities, various computing services may interact with one another when providing computing services to tenants. For example, computing services may be organized as platform services and microservices that support the platform services. For instance, a platform service can be an email exchange service that is configured to handle email reception, forwarding, synchronization, and other suitable operations. An example email exchange service is Outlook® service provided by Microsoft Corporation of Redmond, Wash. With the email exchange service, a user can be allowed to access user content such as emails and attachments in corresponding mailboxes. In order to provide the user content, the email exchange service can rely on one or more microservices for support. For instance, during operation, a mailbox microservice can authenticate itself and then provide emails to the email exchange service, which in turn can provide the received emails to a client device of the user. In another example, a calendar microservice can be configured to provide data of calendar items, reminders, or other suitable content to the email exchange service upon authentication.

In order to facilitate interactions of computing services, computing facilities can implement an authentication service configured to facilitate authentication of microservices to platform services and/or to one another. For instance, an authentication service can be configured to receive an authentication request from a microservice. In response, the authentication service can be configured to validate credentials of the requesting microservice according to an authentication scheme, such as one based on digital certificates. Upon validation of the credentials, the authentication service can be configured to generate and transmit a security token to the microservice based on an authentication profile of the microservice. The authentication profile can contain information such as configuration of token acquisition, identities, and/or other suitable information. The microservice can then utilize the received security token to authenticate itself to a platform service (or other suitable computing services) in order to provide content to or performing other suitable actions for the platform service.

When issuing the security token to the microservice, the authentication service can attest authenticity of the security token by generating and appending a digital signature to the security token using a private key of the authentication service. For example, the authentication service can generate the digital signature by, for instance, hashing the content of the security token and execute a signature algorithm of Rivest-Shamir-Adleman (RSA) or other suitable encryption algorithms. Upon receiving the security token presented by the microservice, a platform service can authenticate the presented security token as being genuine, for example, issued by the authentication service using a public key of the authentication service. For instance, the platform service can validate the digital signature using the public key and determine whether the a hashed form of the content of the digital signature matches that of the presented security token. When the hashed form of the content of the digital signature matches that of the security token, the platform service can indicate that the security token is genuine. Upon successful authentication, the platform service can then accept the security token and continue processing of any corresponding requests from the microservice.

In certain computing facilities, the authentication service can be deployed with the private and public keys as a static key pair during production. Such a deployment arrangement, however, may present certain security risks. For instance, a production personnel such as an engineer or technician may access the static key pair and intentionally, negligently, or otherwise leak the private key to an unauthorized entity. Using the leaked private key, an unauthorized entity may generate counterfeit security tokens that can be accepted by various microservices and/or platform services in the computing facility. As such, using the counterfeit security tokens, the authorized entity may gain access to private or other sensitive user data via the platform services and/or the microservices. Thus, data security in the computing facility may be compromised.

Several embodiments of the disclosed technology can address certain aspects of the foregoing security risks by utilizing ephemeral cryptographic keys at the authentication service in the computing facility. An ephemeral cryptographic key can include a private or public key generated on a server in memory and with a finite lifespan of, for instance, thirty minutes, one hour, or two hours. Upon expiration of the finite lifespan, the server can be configured to discard the existing private/public key pair and regenerate a new private/public key pair in place of the discarded one. As such, ephemeral cryptographic keys are only present and valid for a finite period of time on the server. In certain embodiments, an ephemeral key pair can be generated in response to each request for a security token to the authentication service. In other embodiments, an ephemeral key pair can be generated asynchronously to receiving requests for a security token using, for example, a key service or other suitable types of computing service on the server.

In certain implementations, the authentication service can be deployed with a public key (referred to herein as a master public key) but without a corresponding private key (referred to herein as a master private key). Instead, the corresponding master private key can be stored on a security server or other suitable secure locations for authenticating ephemeral public keys of the authentication service generated during operation. Access to the security server can require higher security clearance than access to production servers configured to deploy the authentication service. As such, any personnel with access to the production servers may not have access to the security server. In other implementations, the master public key can be exposed via metadata indicating a location for copies of the public key. A key-update service can be configured to update the metadata and write a current version of the public key material in a distributed configuration.

During operation, a server hosting the authentication service can be configured to generate an ephemeral keypair having an ephemeral private key and a corresponding ephemeral public key. The server hosting the authentication service can then be configured to authenticate to the security server and request the security server to sign the ephemeral public key by appending a digital signature (referred to herein as master signature) to the ephemeral public key using the master private key at the security server. The server hosting the authentication service can authenticate to the security server using machine credentials such as machine identifiers, account credentials, digital certificates, secured IP, etc., or combinations of at least some of the foregoing techniques. Upon successful authentication, the security server can be configured to sign the ephemeral public key by generating and appending a master signature on the ephemeral public key using the master private key and return a copy of the signed ephemeral public key to the server hosting the authentication service.

During operation, a microservice (or other suitable types of computing service) can transmit to the authentication service a request for a security token. Upon authenticating credentials of the microservice, the authentication service can be configured to generate the requested security token. The authentication service can then be configured to sign the security token by generating and appending a digital signature (referred to herein as ephemeral signature) to the generated security token using the ephemeral private key of the authentication service. The authentication service can then be configured to transmit to the microservice the security token signed with the ephemeral signature along with a copy of the ephemeral public key that is signed with the master signature.

Upon receiving the security token, the microservice can be configured to present a copy of the security token to a platform service for authentication. Upon receiving the presented security token from the microservice, the platform service can be configured to first authenticate the ephemeral public key included in the security token based on the master signature. In certain implementations, the platform service can obtain a copy of the master public key from the authentication service. In other implementations, the platform service can obtain a copy of the master public key from a cryptographic key service or other suitable sources. Upon obtaining the master public key, the platform service can be configured to validate the master signature using the master public key and determine whether a hashed form of the content of the digital signature matches that of the ephemeral public key. In response to determining that the digital signature is validated, the platform service can be configured to indicate successful authentication, i.e., the ephemeral public key being genuine. Otherwise, the platform service can be configured to indicate a failure of authentication of the ephemeral public key and terminate the authentication process.

Upon successful authentication of the ephemeral public key included in the security token, the platform service can be configured to then use the ephemeral public key to authenticate the security token. For instance, the platform service can be configured to validate the ephemeral signature using the included ephemeral public key and determining whether a hashed form of the content of the ephemeral signature matches that of the security token. In response to determining that the hashed form of the content of the ephemeral signature matches that of the security token, the platform service can be configured to indicate successful authentication of the security token, i.e., the security token being genuine. Otherwise, the platform service can be configured to indicate a failure of authentication of the security token and terminate the authentication process. Upon successful authentication of the security token, the platform service can then be configured to accept the security token and perform one or more operations requested by the microservice.

Several embodiments of the disclosed technology can reduce security risks while maintaining authentication authority in the computing facility. Instead of deploying the authentication service with a static key pair, the server hosting the authentication service can generate ephemeral cryptography keys during operation to sign security tokens for proving authenticity. Upon receiving the security token, the platform service can first authenticate the included ephemeral public key as being genuine using the master signature. Upon successful authentication of the included ephemeral public key, the platform service can then authenticate the security token as being genuine using the authenticated ephemeral public key of the authentication service. Personnel having access to production servers may not have access to any ephemeral cryptography keys of the authentication service because such keys are generated during operation, not during production. Thus, security risks related to leaked cryptography keys of the authentication service can be reduced while authentication authority is maintained in the computing facility.

DETAILED DESCRIPTION

Figure 1:
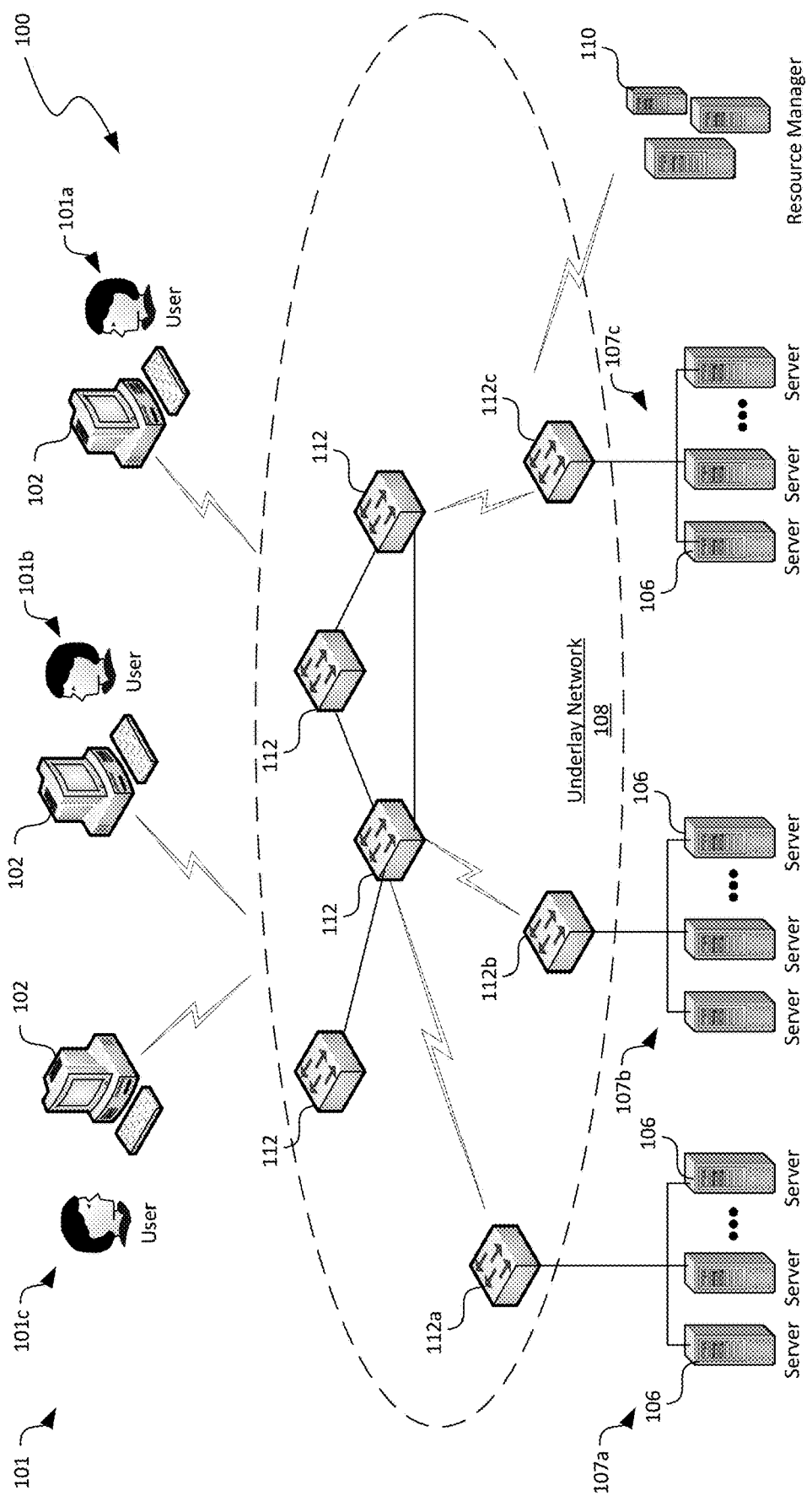
FIG. 1 is a schematic diagram illustrating a distributed computing system implementing keyless authentication of computing services in accordance with embodiments of the disclosed technology.

Certain embodiments of systems, devices, components, modules, routines, data structures, and processes for implementing ephemeral cryptography keys in distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-8.

Many terminologies are used herein to illustrate various aspects of the disclosed technology. Such terminologies are intended as examples and not definitions. For instance, a distributed computing system can be a computing facility having a computer network interconnecting a plurality of host machines or hosts to one another or to external networks (e.g., the Internet). An example of such a computing facility can include a datacenter for providing cloud computing services. A compute network can include a plurality of network devices. A network device can be a physical network device, examples of which include routers, switches, hubs, bridges, load balancers, security gateways, or firewalls. A host or host device can include a computing device that is configured to implement, for instance, one or more virtual machines, containers, or other suitable virtualized components. For example, a host can include a remote server having a hypervisor configured to support one or more virtual machines, containers, or other suitable types of virtual components. In another instance, a host can also include a desktop computer, a laptop computer, a smartphone, a web-enabled appliance (e.g., a camera), or other suitable computing devices configured to implement one or more containers or other suitable types of virtual components.

In another example, a hypervisor can include computer software, firmware, and/or hardware that creates, manages, and runs one or more virtual machines on a host machine. A virtual machine or VM is an emulation of a physical computing system using computer software. Different virtual machines can be configured to provide suitable computing environment to execute different processes for the same or different users on a single host machine. During operation, a hypervisor on the host machine can present different virtual machines with a virtual operating platform to hardware resources on the host machine and manages execution of various processes for the virtual machines.

In a further example, a container can include a software package that contains a piece of software (e.g., an application) in a complete filesystem having computer codes (e.g., executable instructions), a runtime environment, system tools, system libraries, device drivers, or other suitable components sufficient to execute the piece of software. Containers running on a single host or virtual machine can all share the same operating system kernel and can make use of system memory or virtual memory. Containers can have similar resource isolation and allocation benefits as virtual machines. However, a different architectural approach allows containers to be much more portable and efficient than virtual machines. For example, a virtual machine typically includes one or more applications, necessary binaries and libraries of the applications, and an entire operating system. In contrast, a container can include an application and all of its dependencies but shares an operating system kernel with other containers on the same host. As such, containers can be more resource efficient and flexible than virtual machines. One example container is a Windows Server container by Microsoft Corporation of Redmond, Wash. Another example container is a Linux container or LXC. Docker is a popular mechanism to package and deliver containers, provided by Docker, Inc. of San Francisco, Calif.

In yet another example, a computing service or cloud service can include one or more computing resources provided over a computer network such as the Internet. Example cloud services include software as a service (SaaS), platform as a service (PaaS), and infrastructure as a service (IaaS). SaaS is a software distribution technique in which software applications are hosted by a cloud service provider in, for instance, datacenters, and accessed by users over a computer network. PaaS generally includes delivery of operating systems and associated services over the computer network without requiring downloads or installation. IaaS generally includes outsourcing equipment used to support storage, hardware, servers, network devices, or other components, all of which are made accessible over a computer network.

In yet a further example, an authentication service can be a computing service that is configured to facilitate an authentication process upon receiving an authentication request from a requester, such as another computing service. One example authentication service is Security Token Service (STS), which is a cross-platform open standard component of a single sign-on infrastructure framework. Within that claim-based identity framework, STS can be responsible for issuing, validating, renewing, and cancelling security tokens. The security tokens issued by STS can then be used to identify a holder (e.g., a computing service) of the security token to other computing services for accessing resources and/or performing suitable actions.

A security token can be a digital data package that contains security credentials for a login session and identifies an entity, a group of the entity, privilege(s) of the entity, and, in some cases, a particular application. Example security tokens can include a string of random characters that is composed of various fields and values thereof, such as an identifier, an identification of a logon session, a user identifier, a default owner, and/or other suitable fields. As described below, an authentication service can issue a security token to a computing service. The computing service can then authenticate to other computing services by presenting the security token.

In a further example, a static cryptography key can include a cryptography key that is typically used in many instances of a cryptographic key establishment scheme. In contrast, an ephemeral cryptography key can include a cryptography key that is generated for an execution of a key establishment process and can have a finite lifespan such as one hour. A key generator can be configured to periodically determine whether the finite lifespan has expired. In response to determining that the finite lifespan has expired, the key generator can regenerate a new ephemeral cryptography key in place of the original one. Both a static cryptography key and ephemeral cryptography key can be used to generate a digital signature.

In certain computing systems, when issuing a security token to a microservice, an authentication service can attest authenticity of the security token by generating and appending a digital signature to the security token using a private key of the authentication service or otherwise referred to as signing the security token. Upon receiving the security token presented by the microservice, a platform service can authenticate the presented security token as being genuine, i.e., has not been altered in transit using a public key of the authentication service. Upon successful authentication, the platform service can then accept the security token and continue processing of any corresponding requests from the microservice.

In certain computing facilities, the authentication service can be deployed with the private and public keys as a static key pair during production. Such a deployment arrangement, however, may present certain security risks. For instance, a production engineer or technician may access the static key pair and leak the private key to an unauthorized entity. Using the leaked private key, an unauthorized entity may generate counterfeit security tokens that can be accepted by various microservices and/or platform services in the computing facility. As such, using the counterfeit security tokens, the authorized entity may gain access to private or other sensitive user data via the platform services and/or the microservices. Thus, data security in the computing facility may be compromised. Several embodiments of the disclosed technology can address the foregoing drawbacks by implementing an authentication scheme that utilizes ephemeral cryptography keys for the authentication service, as described in more detail below with reference to FIGS. 1-8.

FIG. 1 is a schematic diagram illustrating a distributed computing system 100 implementing ephemeral cryptography keys for authentication of computing services in accordance with embodiments of the disclosed technology. As shown in FIG. 1, the distributed computing system 100 can include a computer network (shown as an underlay network 108) interconnecting a plurality of servers 106, a plurality of client devices 102 of users 101, and a resource manager 110 to one another. The resource manager 110 can be a cluster controller, a fabric controller, a database controller, and/or other suitable types of controller configured to monitor and manage resources and operations of the servers 106 and/or other components in the distributed computing system 100. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple servers 106 and the client devices 102. In certain embodiments, the servers 106 can be organized into racks, action zones, groups, sets, or other suitable divisions. For example, in the illustrated embodiment, the servers 106 are grouped into three clusters identified individually as first, second, and third clusters 107a-107c. In the illustrated embodiment, each of the clusters 107a-107c is operatively coupled to a corresponding network device 112a-112c, respectively, which are commonly referred to as top-of-rack or TOR network devices. The TOR network devices 112a-112c can then be operatively coupled to additional network devices 112 to form a network in a hierarchical, flat, mesh, or other suitable types of topology. The computer network can allow communications among the servers 106 and the client devices 102. In other embodiments, the multiple host machine sets 107a-107c can share a single network device 112 or can have other suitable arrangements.

The servers 106 can individually be configured to provide computing, storage, and/or other suitable cloud computing services to the individual users 101. For example, as described in more detail below with reference to FIG. 2, each of the servers 106 can initiate and maintain one or more virtual machines 144 (shown in FIG. 2) upon requests from the users 101. The users 101 can then utilize the instantiated virtual machines 144 to execute suitable processes for performing computation, communication, and/or other suitable tasks. In certain embodiments, one of the servers 106 can provide virtual machines 144 for multiple users 101. In other embodiments, multiple servers 106 can host virtual machines 144 for one or more users 101a-101c.

The client devices 102 can each include a computing device that facilitates corresponding users 101 to access various computing services provided by the servers 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable numbers of users 101 or administrators to access cloud and/or other suitable types of computing services provided by the servers 106 and/or other components in the distributed computing system 100.

Figure 2:
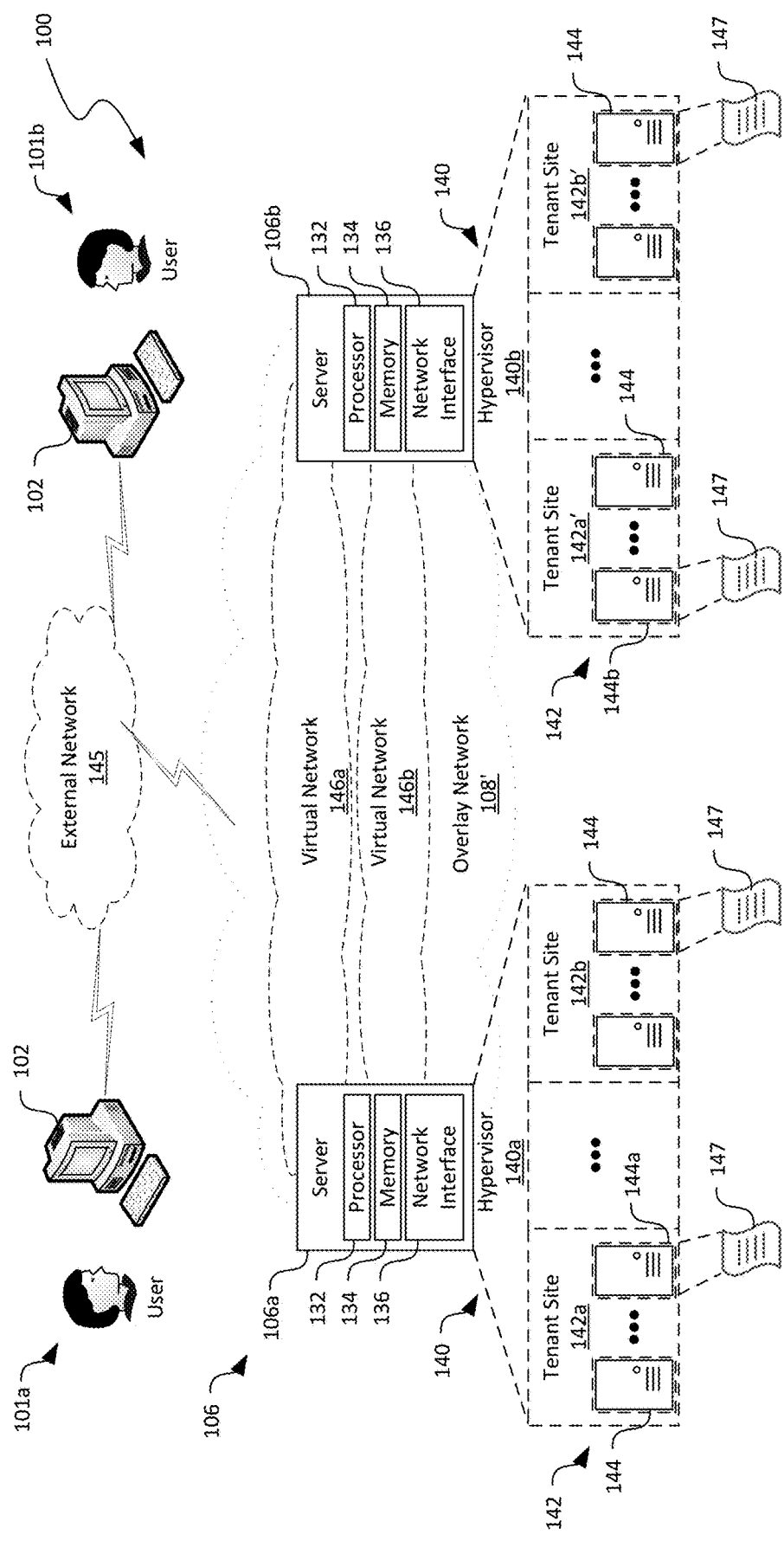
FIG. 2 is a schematic diagram illustrating certain hardware and software components of the distributed computing system of FIG. 1 in accordance with embodiments of the disclosed technology.

FIG. 2 is a schematic diagram illustrating an overlay network 108' that can be implemented on the underlay network 108 in FIG. 1 in accordance with embodiments of the disclosed technology. In FIG. 2, only certain components of the underlay network 108 of FIG. 1 are shown for clarity. As shown in FIG. 2, the first server 106a and the second server 106b can each include a processor 132, a memory 134, and a network interface 136 operatively coupled to one another. The processor 132 can include one or more central processing units, microprocessors, field-programmable gate arrays, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 6A and 6B). The network interface 136 can include a network interface card, a connection converter, and/or other suitable types of input/output devices configured to accept input from and provide output to other components on the overlay networks 108'.

The first server 106a and the second server 106b can individually contain instructions in the memory 134 executable by the processor 132 to cause the individual servers 106a and 106b to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first server 106a can provide a first hypervisor 140a that manages first and second tenant sites 142a and 142b, respectively. The second server 106b can provide a second hypervisor 140b that manages first and second tenant sites 142a' and 142b', respectively. Though the hypervisors 140 are individually shown as software components in FIG. 2, in other embodiments, the hypervisors 140 can also include firmware and/or hardware components.

The tenant sites 142 can each include multiple virtual machines 144 for a particular tenant. For example, the first server 106a and the second server 106b can both host the tenant site 142a and 142a' for a first user 101a. The first server 106a and the second server 106b can both host the tenant site 142b and 142b' for a second user 101b. Each virtual machine 144 can be executing applications 147 or processes corresponding to an operating system, middleware, and/or suitable applications. The executed applications 147 can each correspond to one or more computing services. Examples of such computing services can include platform services, microservices, authentication services, as discussed in more detail below with reference to FIGS. 3A and 3B. The first and second servers 106a and 106b or the virtual machines 144 hosted thereon can also support one or more containers 162 managed by a container manager 160 (shown in FIG. 4A) and individually executing one or more applications 147, as described in more detail below with reference to FIGS. 4A and 4B.

Also shown in FIG. 2, the computing system 100 can include an overlay network 108' having one or more virtual networks 146 that interconnect the tenant sites 142a and 142b across the first and second servers 106a and 106b. For example, a first virtual network 146a interconnects the first tenant sites 142a and 142a' at the first server 106a and the second server 106b. A second virtual network 146b interconnects the second tenant sites 142b and 142b' at the first server 106a and the second server 106b. Even though a single virtual network 146 is shown as corresponding to a single tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different servers 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses.

In operation, the servers 106 can facilitate communications among the virtual machines 144 and/or applications 147 executing in the virtual machines 144. For example, the processor 132 of the first server 106a can execute suitable network communication operations to facilitate the first virtual machine 144a to transmit packets to the second virtual machine 144b via the virtual network 146a by traversing the network interface 136 on the first server 106a, the underlay network 108 (FIG. 1), and the network interface 136 on the second server 106b. As such, the first virtual machine 144a of a tenant site 142a on the first server 106a can cooperate with another virtual machine 144b on another server 106b to execute suitable applications or processes 147 in order to provide suitable computing services to the users 101.

Figure 3A:
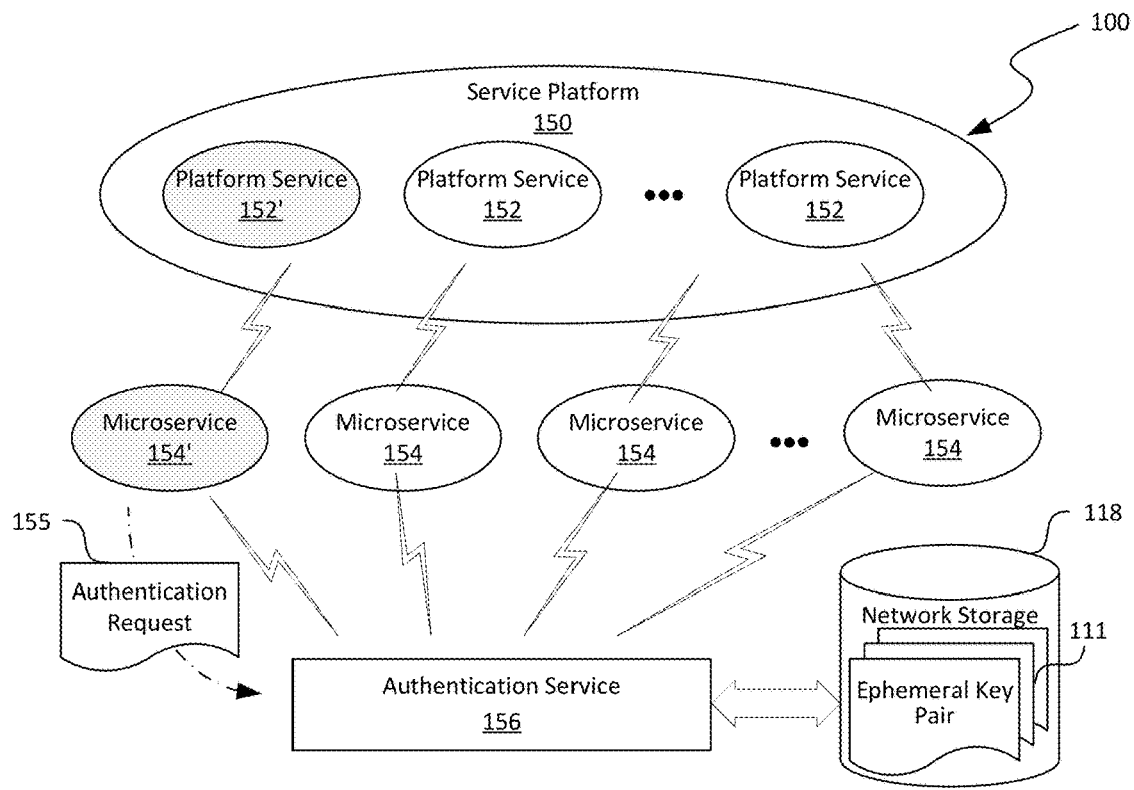
FIGS. 3A and 3B are schematic block diagrams illustrating an example organization of computing services provided in the distributed computing system of FIG. 1 in accordance with embodiments of the present technology.
Figure 3B:
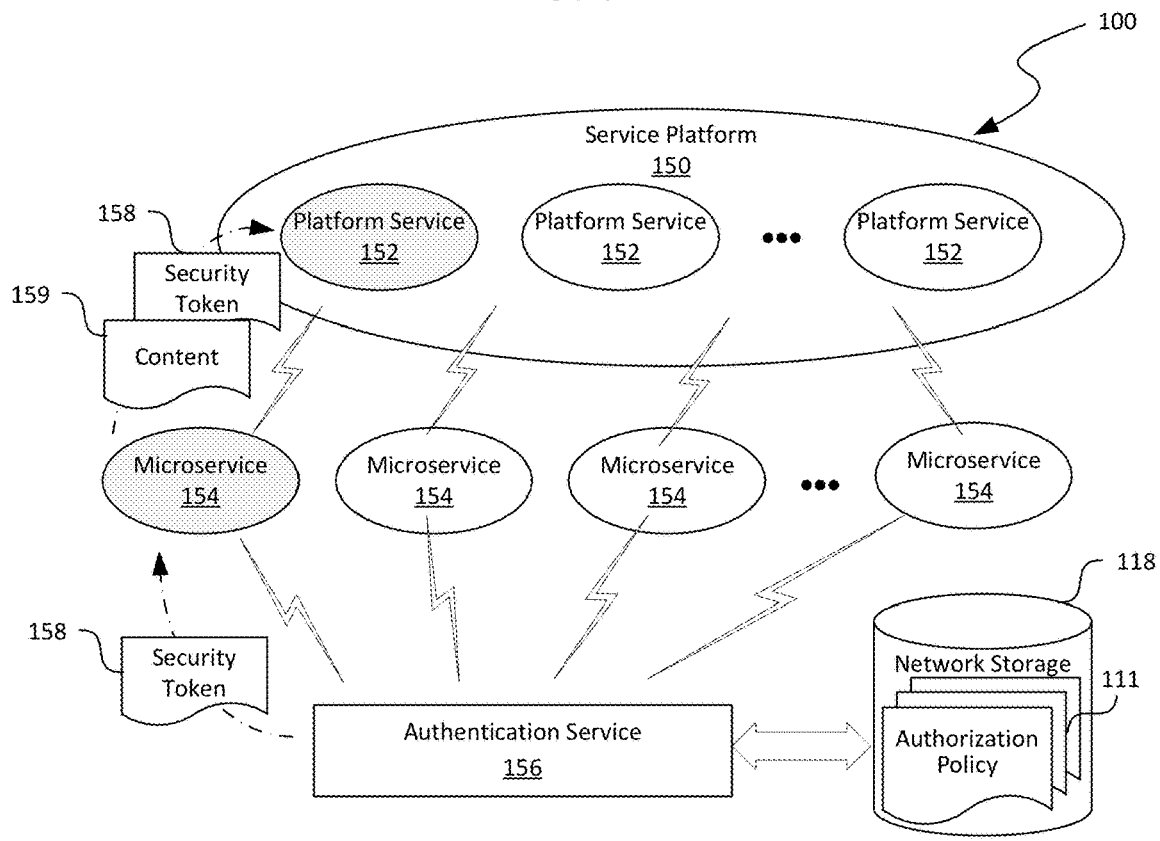

FIGS. 3A and 3B are schematic block diagrams of the distributed computing system 100 having an authentication service 156 configured for issuing security tokens to other computing services in accordance with embodiments of the present technology. In FIGS. 3A and 3B and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term computer readable storage media excludes propagated signals.

As shown in FIG. 3A, the distributed computing system 100 can be configured to provide computing services organized as a collection of platform services 152 in a service platform 150 and microservices 154 that are configured to support the platform services 152. For instance, a platform service 152' can be an email exchange service that is configured to handle email reception, forwarding, synchronization, and other suitable operations. An example email exchange service is Outlook® service provided by Microsoft Corporation of Redmond, Wash. Upon authenticating to the email exchange service, a user 101 (FIG. 1) can be allowed to access content such as emails and email attachments in corresponding mailboxes. In order to provide such content, the email exchange service can rely on one or more microservices 154 for support. For instance, the email exchange service can rely on a mailbox microservice (shown as example microservice 154' in FIG. 3A) for emails or other suitable types of content.

To facilitate operations between pairs of the platform services 152 and the microservices 154, the distributed computing system 100 can also provide an authentication service 156 operatively coupled to a network storage 118 containing an ephemeral key pair 111. The ephemeral key pair 111 can include an ephemeral public key 111a and a corresponding ephemeral private key 111b (shown in FIGS. 4A and 4B). The ephemeral key pair 111 can have a finite lifespan. In certain embodiments, a new ephemeral key pair 111 is generated in response to receiving an authentication request 155. In other embodiments, regeneration of the ephemeral key pair 111 can be asynchronous to receiving the authentication request 155.

During operation, the authentication service 156 can be configured to receive an authentication request 155 from a microservice 154 for a security token 157 (shown in FIG. 3B). In response, as shown in FIG. 3B, the authentication service 156 can be configured to initiate an authentication process with the microservice 152 in order to validate security credentials of the microservice 154 according to a selected authentication scheme, such as one based on digital certificates or other suitable types of credentials. Upon validation of the credentials, the authentication service 156 can be configured to generate and transmit a security token 158 (or other suitable security articles) to the microservice 154. The microservice 154 can then utilize the received security token 158 to authenticate itself to a platform service 152 (or other suitable computing services) in order to provide content 159 to or performing other suitable actions for the platform service 152. In turn, the platform service 152 can forward the received content 159 to a client device 102 (FIG. 1) of the user 101. During issuance and acquisition of the security token 156, the distributed computing system 100 can utilize the ephemeral key pair 111 at the authentication service 156 for authenticating the issued security token 158, as described in more detail below with reference to FIGS. 4A-6C.

Figure 4A:
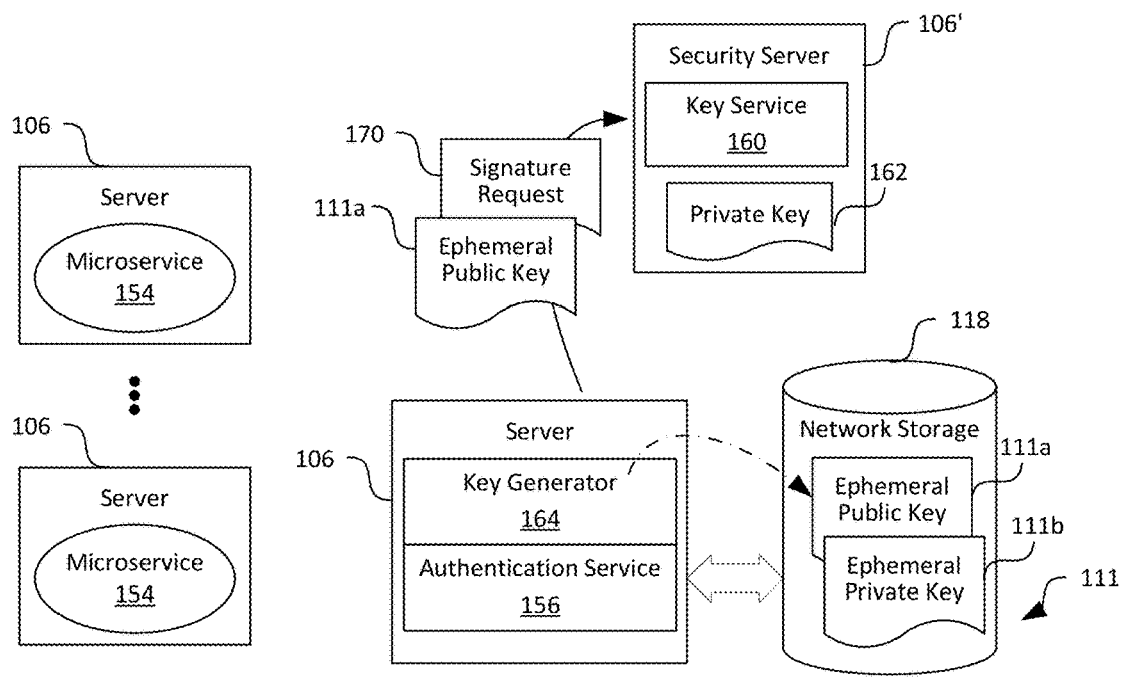
FIGS. 4A and 4B are schematic block diagrams illustrating generating and signing ephemeral cryptography keys in the distributed computing system in accordance with embodiments of the present technology.
Figure 4B:
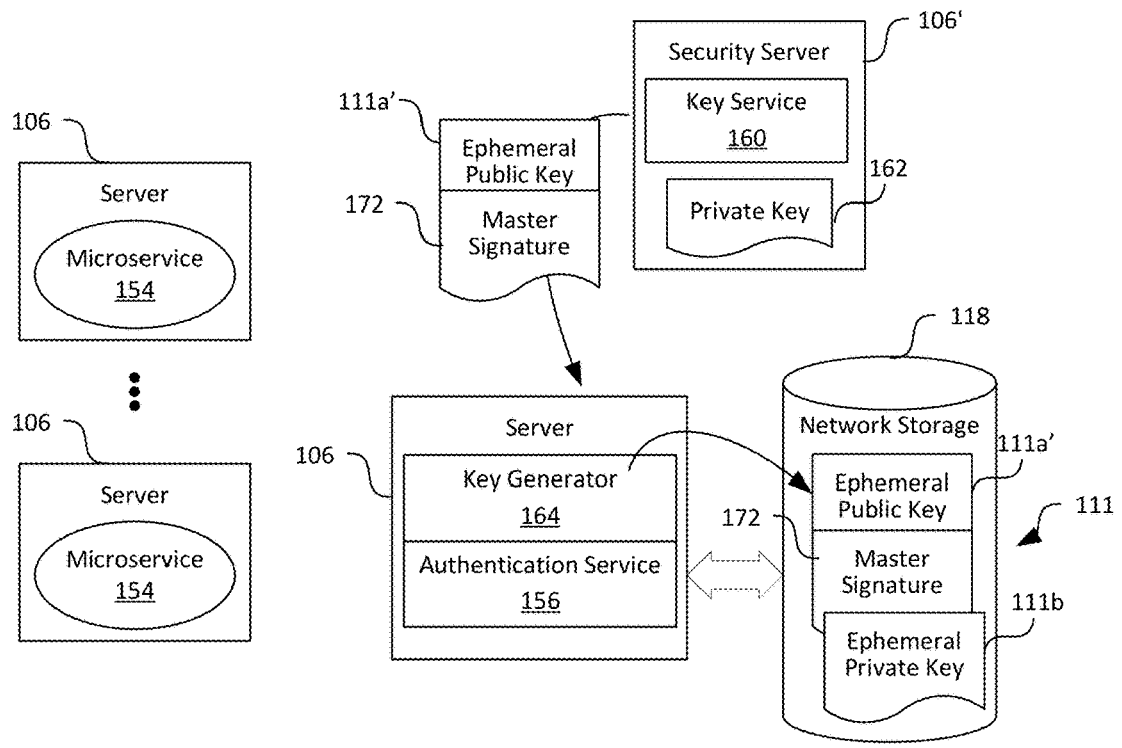

FIGS. 4A and 4B are schematic block diagrams illustrating generating and signing ephemeral cryptography keys in the distributed computing system 100 in accordance with embodiments of the present technology. As shown in FIG. 4A, servers 106 in the distributed computing system 100 can be configured to execute suitable instructions with a processor 132 (FIG. 2) to provide various computing services. In the illustrated embodiment, one or more servers 106 can each provide a microservice 154 while another server 106 can provide an authentication service 156 and a key generator 164. In other embodiments, a single server 106 can provide at least some or even all of the foregoing computing services.

As shown in FIG. 4A, another server 106' (illustrated as security server 106') can be configured to provide a key service 160 that manages access to a static private key 162 stored at the security server 106'. The private key 162 can be used for authenticating an ephemeral public key generated on the server 106 hosting the authentication service 156 of the authentication service generated during operation. Access to the security server 106' can require higher security clearance than access to other servers 106 configured to deploy the authentication service 156. As such, any personnel with access to the other servers 106 may not have access to the security server 106'. Operations of the key service 160 are described in more detail below.

The authentication service 156 can be configured to issue security tokens 158 (FIG. 3B) to the microservices 154, as described in more detail below with reference to FIGS. 5A and 5B. The key generator 164 can be configured to generate the ephemeral key pair 111 for the authentication service 156. For instance, as shown in FIG. 4A, the key generator 164 can generate an ephemeral public key 111a and a corresponding ephemeral private key 111b. The ephemeral public key 111a and the ephemeral private key 111b can each include data representing a string of alphanumeric characters with suitable metadata such as an expiration date/time, a key identifier, or other suitable information. The ephemeral public key 111a can be used to encrypt a document or other suitable types of data that can be later decrypted using the ephemeral private key 111b. Similarly, the ephemeral private key 111a can also be used to encrypt a document or other suitable types of data that can be later decrypted using the ephemeral public key 111a.

In certain implementations, the created ephemeral key pair 111 can have a finite lifespan such as one hour. For instance, the key generator 164 can be configured to set an expiration date/time for the ephemeral key pair 111 and periodically determine whether the expiration date/time of the ephemeral key pair 111 has elapsed. In response to determining that the expiration date/time has elapsed, the key generator 164 can be configured to regenerate the ephemeral key pair 111 in place of the original one. In other examples, the key generator 164 can be configured to regenerate the ephemeral key pair 111 upon receiving a token request 174 (shown in FIG. 5A) to the authentication service 156. In further examples, the ephemeral key pair 111 can be generated and maintained in other suitable manners.

Upon generating the ephemeral key pair 111, the key generator 164 can be configured to transmit a signature request 170 to the key service 160 at the security server 106' for generating a digital signature of the ephemeral public key 111a using the private key 162 stored at the security server 106'. In certain embodiments, the signature request 170 can include a copy of the ephemeral public key 111a as well as other credentials (not shown) for authenticating the key generator 164 (and/or the authentication service 156) to the key service 160. In response, as shown in FIG. 4B, the key service 160 can be configured to authenticate the signature request 170 and upon successful authentication, generate a digital signature of the ephemeral public key 111a (shown as Master Signature 172 in FIG. 4B) and append the generated master signature 172 to the ephemeral public key 111a, and thus creating a signed version of the ephemeral public key 111a'. the key service 160 can then be configured to transmit the signed ephemeral public key 111a to the key generator 164 at the server 106, which in turn stores the signed ephemeral public key 111a' in the network storage 118.

Figure 5A:
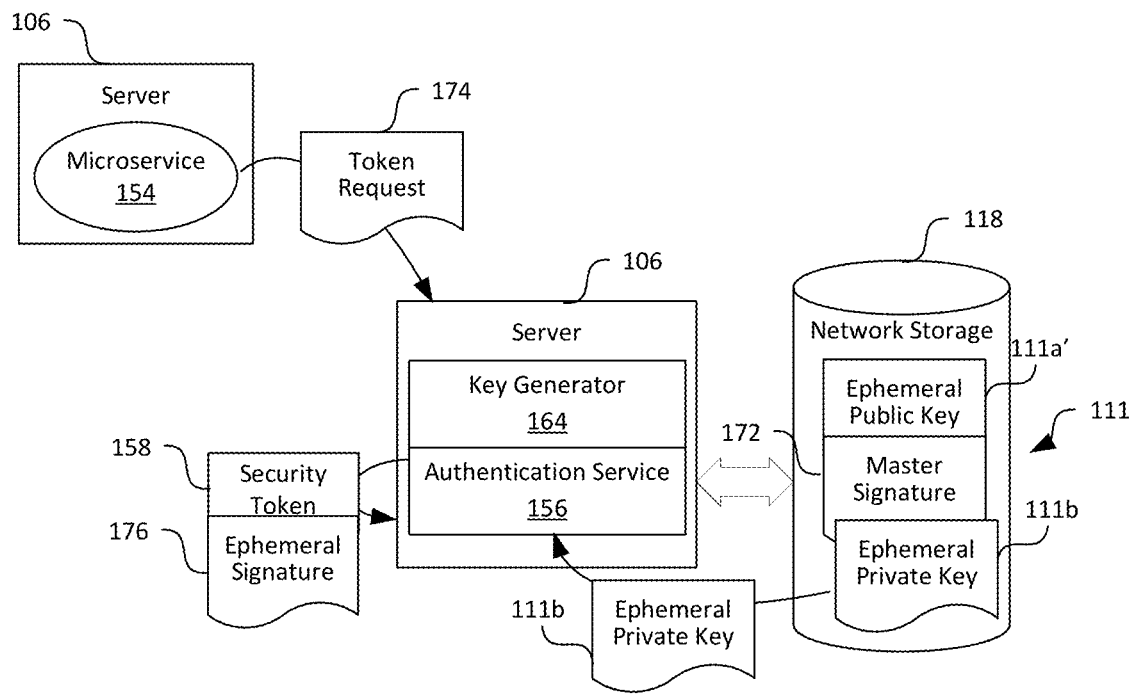
FIGS. 5A and 5B are schematic block diagrams illustrating generating and issuing security tokens in the distributed computing system in accordance with embodiments of the present technology.
Figure 5B:
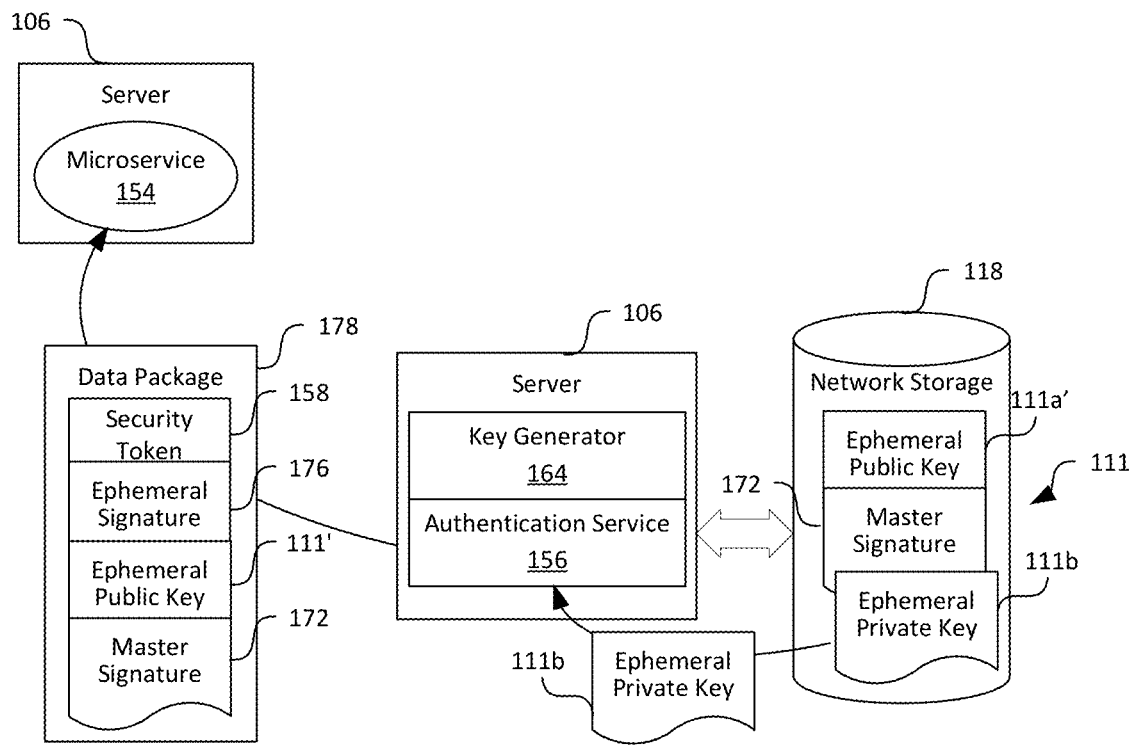

FIGS. 5A and 5B are schematic block diagrams illustrating generating and issuing security tokens 158 in the distributed computing system 100 in accordance with embodiments of the present technology. As shown in FIG. 5A, the microservice 154 can be configured to transmit a token request 174 to the authentication service 156 with suitable credentials (not shown). In response, the authentication service 156 can authenticate the received token request 174 and generate a security token 158 upon successful authentication. The authentication service 156 can also be configured to retrieve a current version of the ephemeral private key 111b from the network storage 118 and generate a digital signature (shown as Ephemeral Signature 176) of the security token 158. Thus, the authentication service 156 can sign the generated security token 158 with the generated ephemeral signature 176.

As shown in FIG. 5B, the authentication service 156 can then be configured to generate and transmit a data package 178 as a response to the token request 174 (FIG. 5A). In the illustrated embodiment, the data package 178 can include the generated security token 158, the ephemeral signature 176, and a copy of ephemeral public key 111a' with the master signature 172. In other embodiments, the data package 178 can also include additional data and/or metadata. For instance, the data package 178 can include a token type (e.g., JSON web token), an algorithm used to sign the security token 158 (e.g., RS256), a key identifier, a finger print of the security token 178, a version of the security token 178, and/or other suitable types of data or metadata. With the data package 178, the microservice 154 can authenticate itself to other computing services in the distributed computing system 100 in order to perform suitable operations, as described below in more detail with reference to FIGS. 6A-6C.

Figure 6A:
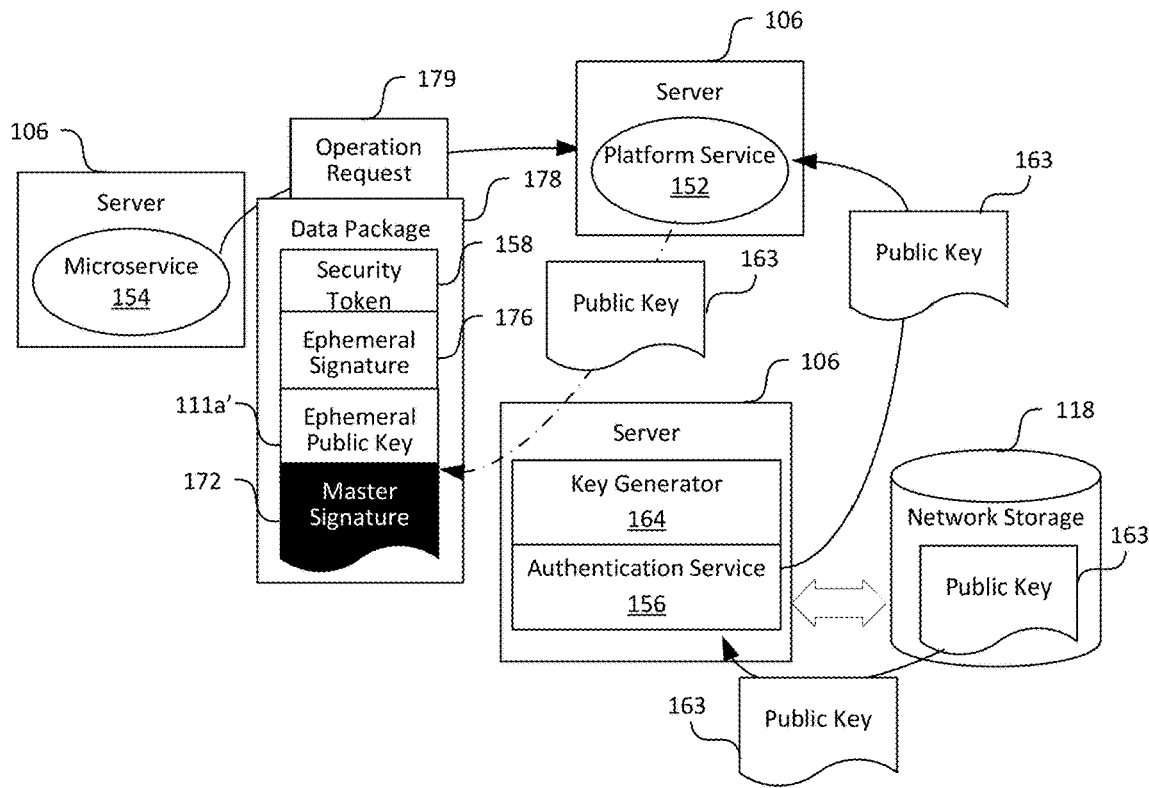
FIGS. 6A-6C are schematic block diagrams illustrating presenting and authenticating security tokens in the distributed computing system in accordance with embodiments of the present technology.
Figure 6B:
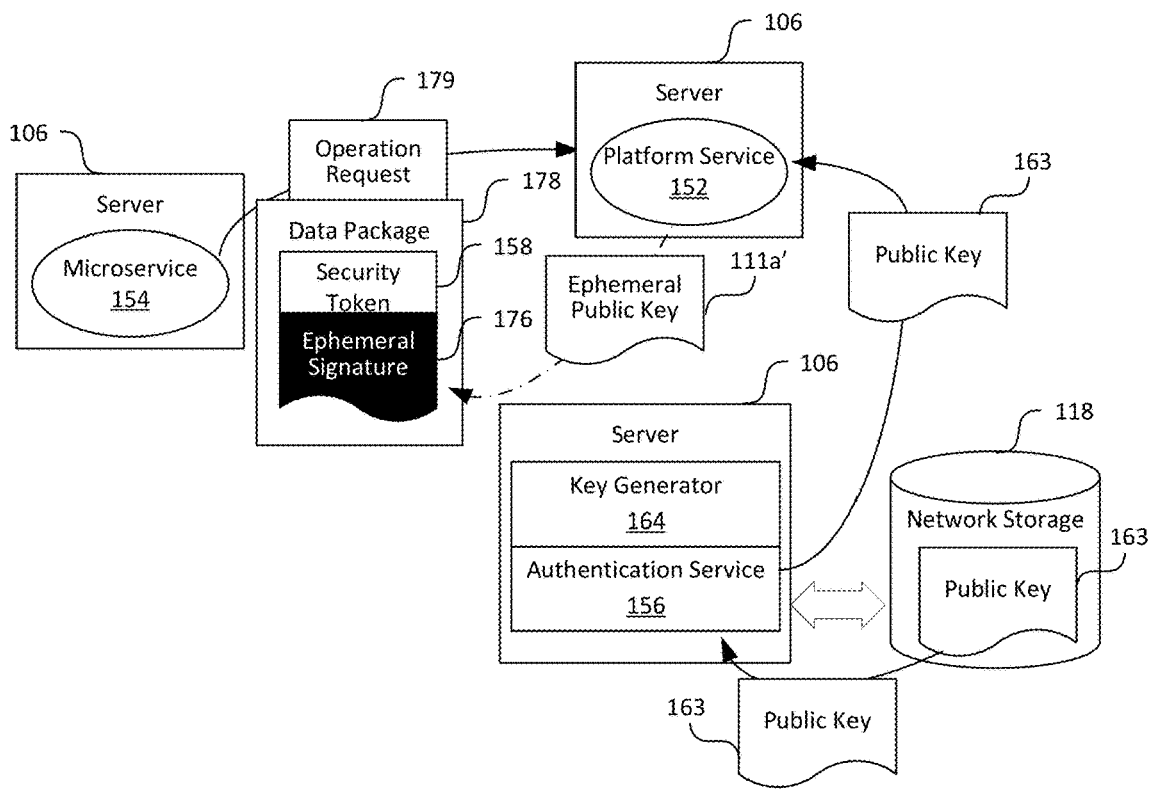
Figure 6C:
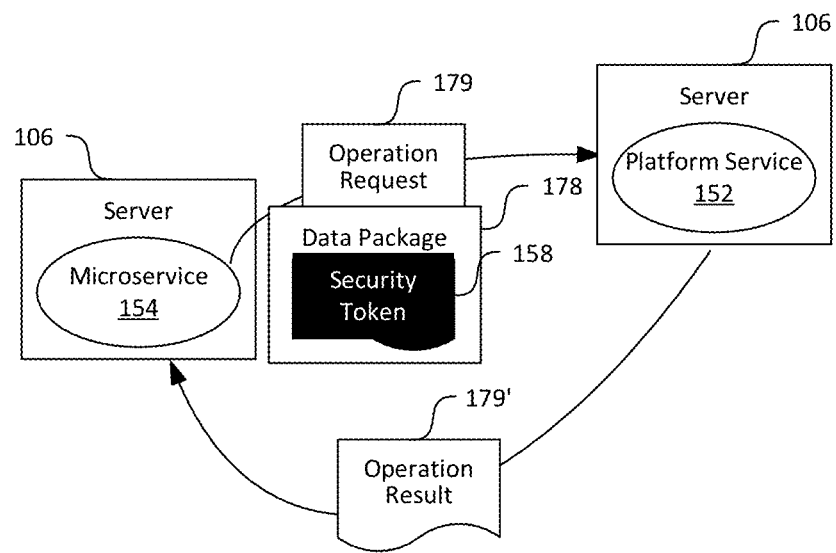

FIGS. 6A-6C are schematic block diagrams illustrating presenting and authenticating security tokens 178 in the distributed computing system 100 in accordance with embodiments of the present technology. As shown in FIG. 6A, upon receiving an operation request 179 with the data package 178 from the microservice 154, in certain embodiments, a platform service 152 can retrieve a public key 163 corresponding to the private key 162 (FIG. 4A) stored at the security server 106' (FIG. 4A). In other embodiments, the platform service 152 can retrieve the public key 163 from the key service 160 (FIG. 4A) at the security server 106' or from other suitable sources.

Upon retrieving the public key 163, the platform service 152 can be configured to validate the master signature 172 included in the data package 178. For instance, the platform service 152 can use the public key 163 to validate the master signature 172 (shown in reverse contrast for clarity) and determine whether a hashed form of the content of the master signature 172 matches that of the ephemeral public key 111a' included in the data package 178. In response to determining that the hashed form of the content of the master signature 172 matches that of the ephemeral public key 111a' included in the data package 178, the platform service 152 can be configured to indicate that the ephemeral public key 111a' has not been altered during transit and thus is genuine.

Upon determining that the ephemeral public key 111a' is genuine, the platform service 152 can be configured to use the ephemeral public key 111a' included in the data package 178 to validate the ephemeral signature 176. For instance, the platform service 152 can be configured to validate the ephemeral signature 176 (shown in reverse contrast for clarity) and determine whether a hashed form of the content of the ephemeral signature 176 matches that of the security token 158 in the data package 178. In response to determining that the hashed form of the content of the ephemeral signature 176 matches the security token 158 in the data package 178, the platform service 152 can indicate that the security token 158 has not been altered during transit and thus is genuine and accept the security token 158 for authenticating the operation request 179 from the microservice 154. Upon authenticating the operation request 179 based on the security token 158 (shown in reverse contrast for clarity), the platform service 152 can be configured to perform one or more requested operations and provide an operation result 179' to the microservice 154, as shown in FIG. 6C.

Figure 7A:
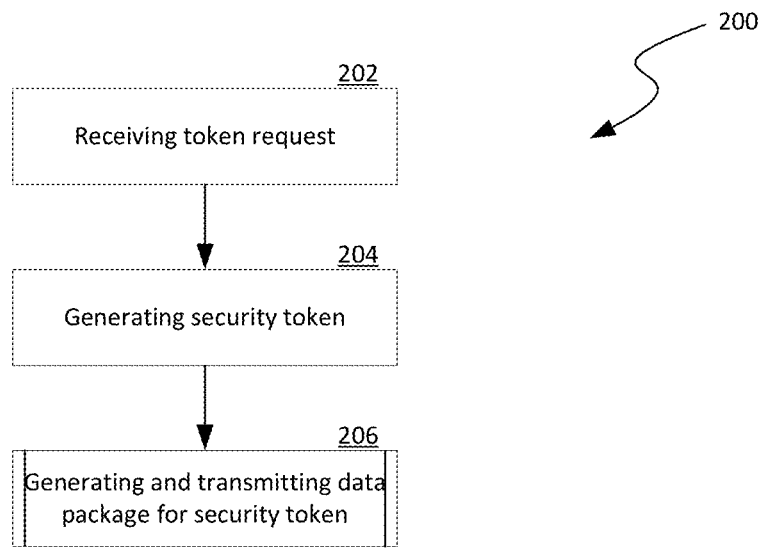
FIGS. 7A-7C are flow diagrams illustrating aspects of processes for ephemeral cryptography keys for authentication computing services in accordance with embodiments of the present technology.
Figure 7B:
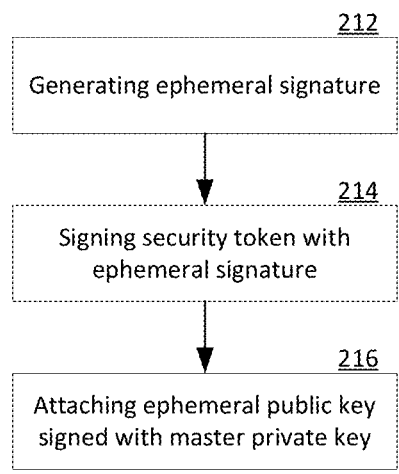
Figure 7C:
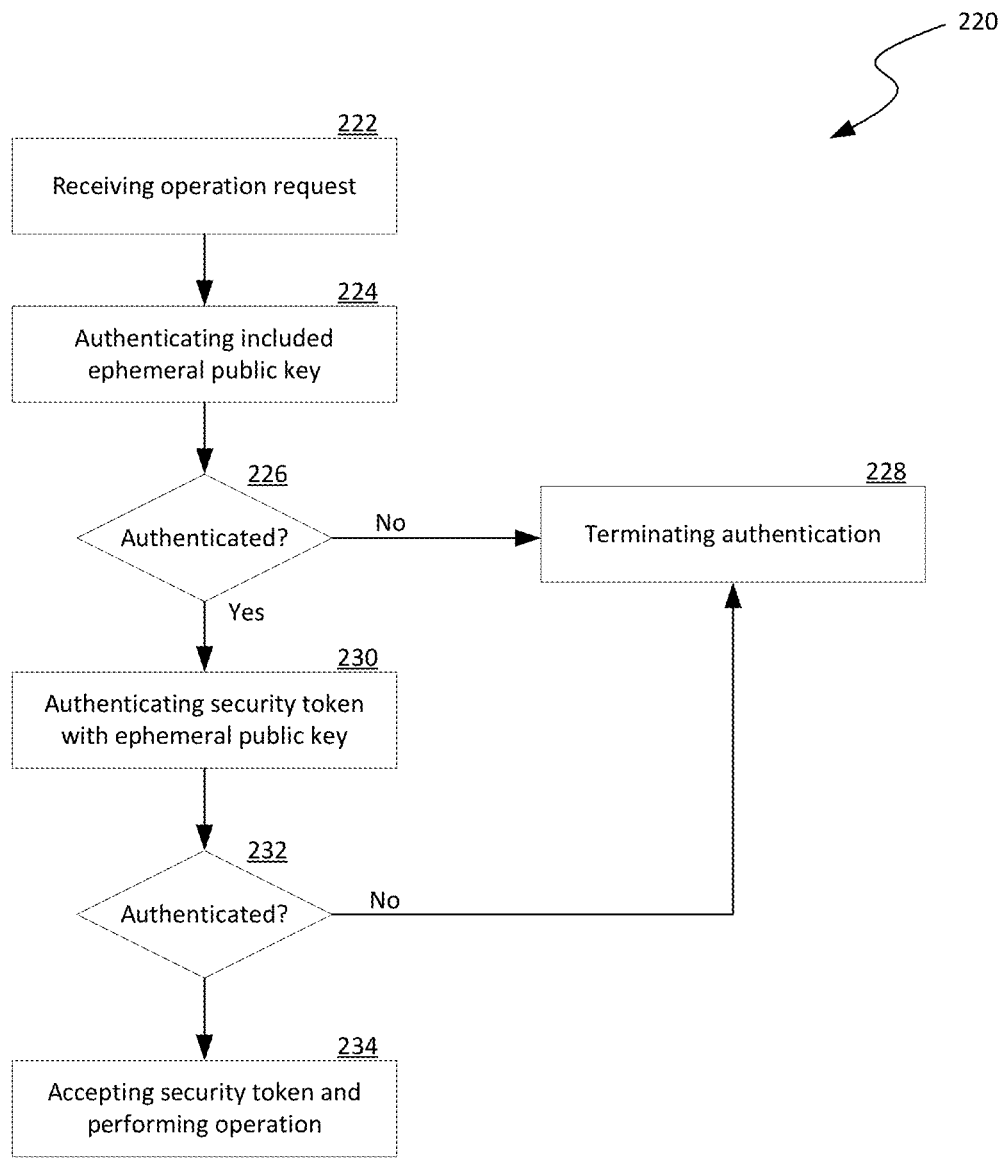

FIGS. 7A-7C are flow diagrams illustrating aspects of processes for ephemeral cryptography keys for authentication computing services in accordance with embodiments of the present technology. Though the processes are described below in the context of the distributed computing system 100 shown in FIGS. 1-6C, embodiments of the processes may also be implemented in other computing systems with additional and/or different components.

As shown in FIG. 7A, a process 200 can include receiving a token request for a security token from a computing service at stage 202. The security token is configured to authenticate the computing service to another computing service in the distributed computing system. The process 200 can also include generating the requested security token upon verifying credentials of the computing service at stage 204. The process 200 can further include generating and transmitting a data package having the security token to the computing service at stage 206. As described in more detail above with reference to FIGS. 5A and 5B, the data package can include the security token, a first digital signature of the security token generated using an ephemeral private key of the authentication service, and an ephemeral public key corresponding to the ephemeral private key of the authentication service with a second digital signature of the ephemeral public key generated using the private key 162 (FIG. 4A) stored at the security server 106' (FIG. 4A). Example operations of generating the data package are described in more detail below with reference to FIG. 7B.

As shown in FIG. 7B, example operations of generating the data package can include generating an ephemeral signature using an ephemeral private key of the authentication service at stage 212. The example operations can also include signing the security token with the ephemeral signature at stage 214. The example operations can further include attaching a copy of an ephemeral public key signed with a static private key, such as the private key 162 (FIG. 4A) at the security server 106' (FIG. 4A) at stage 216.

FIG. 7C illustrates a process 220 of authenticating a security token at a computing service in accordance with embodiments of the disclosed technology. As shown in FIG. 7C, the process 220 can include receiving an operation request along with a data package as described above with reference to FIG. 7A at stage 222. The process 220 can then include authenticating an ephemeral public key included in the data package at stage 224. The process 220 can then include a decision stage 226 to determine whether the ephemeral public key is authentic. In one embodiment, the ephemeral public key is authentic when a digital signature attached to the ephemeral public key is validated using a public key 163 (FIG. 6A) corresponding to the private key 162 (FIG. 4A). In other embodiments, the ephemeral public key can be validated in other suitable manners.

In response to determining that the ephemeral public key is authentic, the process 220 can include authenticating the security token with the ephemeral public key included in the data package at stage 230. The process 220 can then include another decision stage 232 to determine whether the security token is authentic. In response to determining that the security token is authentic, the process 220 proceeds to accepting the security token as authentic and performing one or more requested operations at the computing service at stage 234. In response to determining that either the ephemeral public key or the security token is not authentic, the process 220 proceeds to terminating the authentication process, rejecting the operating request, issuing an error message, or performing other suitable operations at stage 228.

Figure 8:
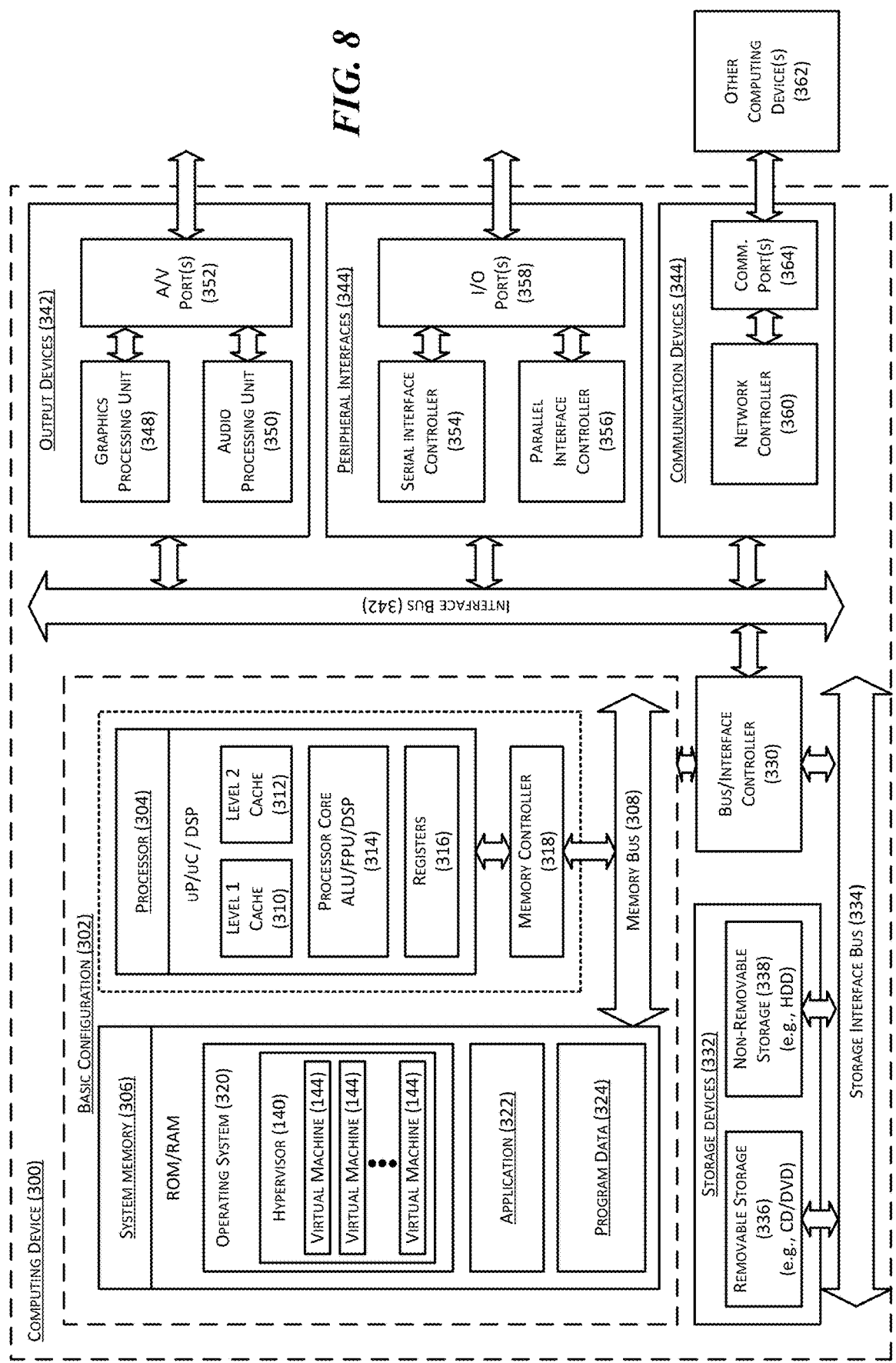
FIG. 8 is a computing device suitable for certain components of the distributed computing system in FIG. 1.

FIG. 8 is a computing device 300 suitable for certain components of the distributed computing system 100 in FIG. 1, for example, the server 106, the client device 102, or the resource manager 110. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 8, the operating system 320 can include a hypervisor 140 140 for managing one or more virtual machines 144. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term computer readable storage media or computer readable storage device excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term computer readable storage medium excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of data authentication in a distributed computing system having a security server storing a static private key and multiple additional servers hosting multiple computing services and an authentication service, the method comprising:
   upon receiving, at the authentication service, a request from a first computing service for a security token that is configured to authenticate the first computing service to a second computing service, transmitting, to the first computing service, a data package including:
   the security token requested by the first computing service;
   a first digital signature of the security token generated using an ephemeral private key of the authentication service; and
   an ephemeral public key corresponding to the ephemeral private key of the authentication service with a second digital signature of the ephemeral public key generated using the private key stored at the security server of the distributed computing system; and upon receiving, from the first computing service, a request for performing an operation along with a copy of the data package, at the second computing service, validating the second digital signature using a public key corresponding to the private key stored at the security server;

upon validating the second digital signature, validating, using the ephemeral public key included in the copy of the data package, the first digital signature of the security token; and upon validating that the first digital signature of the security token, authenticating the request for performing the operation and performing the operation requested by the first computing service.

2. The method of claim 1, further comprising:
periodically generating, at a server hosting the authentication service, the ephemeral private key and the ephemeral public key in memory of the server hosting the authentication service, the generated ephemeral private key and the ephemeral public key having a finite lifespan; and
generating the first digital signature of the security token using the generated ephemeral private key of the authentication service currently present in the memory of the server.

3. The method of claim 1, further comprising:
generating, at a server hosting the authentication service, the ephemeral private key and the ephemeral public key in memory of a server hosting the authentication service, the generated ephemeral private key and the ephemeral public key having a finite lifespan;
determining, at the server hosting the authentication service, whether the finite lifespan has expired; and
in response to determining that the finite lifespan has expired,
discarding the ephemeral private key and the ephemeral public key from the memory of the server; and
regenerating another ephemeral private key and another ephemeral public key in the memory of the server.

4. The method of claim 1, further comprising:
generating the second digital signature by:
transmitting, to the security server a request for the second digital signature of the ephemeral public key; and
receiving, from the security server, a copy of the generated ephemeral public key with the digital signature generated using the private key stored at the security server.

5. The method of claim 1, further comprising:
generating, at a server hosting the authentication service, the ephemeral private key and the ephemeral public key in memory of a server hosting the authentication service;
transmitting, from the server to the security server a request for the second digital signature of the ephemeral public key; and
receiving, from the security server, a copy of the generated ephemeral public key with the second digital signature generated using the private key stored at the security server.

6. The method of claim 1, further comprising:
upon receiving, from the first computing service, a copy of the data package at the second computing service,
retrieving, from the authentication service, the public key corresponding to the private key stored at the security server; and validating the second digital signature using the public key retrieved from the authentication service.

7. The method of claim 1, further comprising:
generating, at a server hosting the authentication service, the ephemeral private key and the ephemeral public key in memory of a server hosting the authentication service, the generated ephemeral private key and the ephemeral public key having a finite lifespan;
determining, at the server hosting the authentication service, whether the finite lifespan has expired; and
in response to determining that the finite lifespan has expired,
regenerating another ephemeral private key and another ephemeral public key in the memory of the server;
transmitting, from the server to the security server a request for a third digital signature of the regenerated ephemeral public key; and
receiving, from the security server, a copy of the regenerated ephemeral public key with the third digital signature generated using the private key stored at the security server.

8. A method of data authentication in a distributed computing system having a security server storing a static private key and multiple additional servers hosting multiple computing services and an authentication service, the method comprising:
receiving, at the authentication service, data representing a request from a computing service for a security token that is configured to authenticate the computing service to another computing service in the distributed computing system; and
in response to receiving the request for the security token, at the authentication service,
generating the requested security token;
creating a digital signature of the generated security token using an ephemeral private key of the authentication service; and
transmitting, to the computing service, a data package as a response to the received request, the data package including:
the generated security token;
the digital signature of the generated security token created using the ephemeral private key of the authentication service; and
an ephemeral public key corresponding to the ephemeral private key of the authentication service, the ephemeral public key including a digital signature of the ephemeral public key generated using the private key stored at the security server.

9. The method of claim 8, further comprising generating, at a server hosting the authentication service, the ephemeral private key and the ephemeral public key in memory of the server hosting the authentication service, the generated ephemeral private key and the ephemeral public key having a finite lifespan.

10. The method of claim 8 wherein the authentication service is deployed on the server without a static private key or a static public key, and wherein the method further comprises generating, at a server hosting the authentication service, the ephemeral private key and the ephemeral public key in memory of the server hosting the authentication service, the generated ephemeral private key and the ephemeral public key having a finite lifespan.

11. The method of claim 8, further comprising:
generating, at a server hosting the authentication service, the ephemeral private key and the ephemeral public key in memory of the server hosting the authentication service, the generated ephemeral private key and the ephemeral public key having a finite lifespan;

determining, at the server hosting the authentication service, whether the finite lifespan has expired; and in response to determining that the finite lifespan has expired, discarding the ephemeral private key and the ephemeral public key from the memory of the server; and regenerating another ephemeral private key and another ephemeral public key in the memory of the server.

12. The method of claim 8, further comprising:

generating, at a server hosting the authentication service, the ephemeral private key and the ephemeral public key in memory of the server hosting the authentication service;

transmitting, from the server to the security server a request for the digital signature of the ephemeral public key; and receiving, from the security server, a copy of the generated ephemeral public key with the digital signature generated using the private key stored at the security server.

13. The method of claim 8, further comprising:

generating, at a server hosting the authentication service, the ephemeral private key and the ephemeral public key in memory of the server hosting the authentication service, the generated ephemeral private key and the ephemeral public key having a finite lifespan;

determining, at the server hosting the authentication service, whether the finite lifespan has expired; and in response to determining that the finite lifespan has expired, regenerating another ephemeral private key and another ephemeral public key in the memory of the server;

transmitting, from the server to the security server a request for a digital signature of the regenerated ephemeral public key; and receiving, from the security server, a copy of the regenerated ephemeral public key with the digital signature generated using the private key stored at the security server.

14. The method of claim 8 wherein:

the digital signature of the generated security token includes a copy of the security token signed using the ephemeral private key, the signed copy of the security token can be validated using the ephemeral public key; and the digital signature of the ephemeral public key includes a copy of the ephemeral public key signed using the private key stored at the security server, the signed ephemeral public key is can be validated using a public key corresponding to the private key stored at the security server.

15. The method of claim 8, further comprising:

upon receiving, from the computing service, a copy of the data package at the another computing service, authenticating the copy of the ephemeral public key by validating the digital signature of the ephemeral public key generated using the private key stored at the security server; and upon authenticating the copy of the ephemeral public key, authenticating the security token by validating, using the authenticated ephemeral public key, the digital signature of the security token created using the ephemeral private key of the authentication service.

16. The method of claim 8, further comprising:

upon receiving, from the computing service, a copy of the data package at the another computing service, retrieving, from the authentication service, a public key corresponding to the private key stored at the security server;

authenticating the copy of the ephemeral public key by validating, using the retrieved public key, the digital signature of the ephemeral public key generated using the private key stored at the security server; and upon authenticating the copy of the ephemeral public key, authenticating the security token by validating, using the authenticated ephemeral public key, the digital signature of the security token created using the ephemeral private key of the authentication service.

17. A computing device in a distributed computing system having a security server storing a static private key and multiple additional servers hosting multiple computing services and an authentication service, comprising:

a processor; and a memory operatively coupled to the processor, the memory containing instructions executable by the processor to cause the computing device to provide a computing service, wherein the memory also contains additional instructions executable by the processor to cause the computing device to:

receive, from another computing service, a request for performing an operation along with a data package having:

a security token of the another computing service;

a first digital signature of the security token generated using an ephemeral private key of the authentication service; and an ephemeral public key corresponding to the ephemeral private key of the authentication service with a second digital signature of the ephemeral public key generated using the private key stored at the security server of the distributed computing system; and in response to receiving the request, at the computing device, validate the second digital signature using a public key corresponding to the private key stored at the security server;

upon validating the second digital signature, validate, using the ephemeral public key included in the data package, the first digital signature; and upon validating that the first digital signature, perform the operation requested by the another computing service.

18. The computing device of claim 17 wherein the memory includes further instructions executable by the processor to cause the computing device to:

retrieve, from the authentication service, a public key corresponding to the private key stored at the security server; and wherein to validate the second digital signature includes to validate the second digital signature using the retrieved public key from the authentication service.

19. The computing device of claim 17 wherein the memory includes further instructions executable by the processor to cause the computing device to:

receive, from the another computing service, another request for performing another operation along with another data package having:
  the security token of the another computing service;
  a third digital signature of the security token generated using a new ephemeral private key of the authentication service; and
  a new ephemeral public key corresponding to the new ephemeral private key of the authentication service with a fourth digital signature of the new ephemeral public key generated using the same private key stored at the security server of the distributed computing system;
in response to receiving the another request, at the computing device,
  validate the fourth digital signature using the public key corresponding to the private key stored at the security server;
  upon validating the fourth digital signature, validating, using the new ephemeral public key included in the another data package, the third digital signature; and
  upon validating that the third digital signature, performing the another operation requested by the another computing service.

20. The computing device of claim 17 wherein the memory includes further instructions executable by the processor to cause the computing device to:
  upon validating the second digital signature, indicate the ephemeral public key as being genuine; and
  upon validating that the first digital signature, indicate the security token as being genuine.

* * * * *